(12) United States Patent
Zumsteg (10) Patent No.: US 7,719,994 B2
(45) Date of Patent: May 18, 2010

(54) SUB-FRAME SYNCHRONIZED RANGING (75) Inventor: Philip J. Zumsteg, Shorewood, MN (US)

(73) Assignee: Honeywell International Inc., Morristown, NJ (US)

( * ) Notice: Subject to any disclaimer, the term of this patent is extended or adjusted under 35 U.S.C. 154(b) by 905 days.

(21) Appl. No.: 11/380,252

(22) Filed: Apr. 26, 2006

(65) Prior Publication Data

US 2007/0253400 A1    Nov. 1, 2007

(51) Int. Cl.
*H04J 1/16* (2006.01)
(52) U.S. Cl. .................. 370/252; 370/241; 370/310; 370/312; 342/458
(58) Field of Classification Search .......... 370/241, 370/246–252, 310; 367/19; 342/458
See application file for complete search history.

(56) References Cited

U.S. PATENT DOCUMENTS

| | | | |
|---|---|---|---|
| 3,813,496 A | 5/1974 | Maillet |
| 4,021,780 A | 5/1977 | Narey et al. |
| 5,485,163 A | 1/1996 | Singer et al. |
| 5,508,708 A | 4/1996 | Ghosh et al. |
| 5,512,908 A | 4/1996 | Herrick |
| 5,926,765 A | 7/1999 | Sasaki |
| 5,952,969 A | 9/1999 | Hagerman et al. |
| 5,973,643 A | 10/1999 | Hawkes et al. |
| 6,006,097 A | 12/1999 | Hornfeldt et al. |
| 6,011,974 A | 1/2000 | Cedervall et al. |
| 6,031,490 A | 2/2000 | Forssen et al. |
| 6,034,635 A | 3/2000 | Gilhousen |
| 6,052,597 A | 4/2000 | Ekstrom |
| 6,061,021 A | 5/2000 | Zibell |
| 6,084,547 A | 7/2000 | Sanderford et al. |
| 6,108,553 A | 8/2000 | Silventoinen et al. |
| 6,121,928 A | 9/2000 | Sheynblat et al. |
| 6,127,945 A | 10/2000 | Mura-Smith |

(Continued)

FOREIGN PATENT DOCUMENTS

JP    4023644    1/1992

OTHER PUBLICATIONS

Wikipedia. "MAC address." Apr. 1, 2005. <http://web.archive.org/web/20050401083346/http://en.wikipedia.org/wiki/MAC_address>.*

(Continued)

*Primary Examiner*—William Trost, IV
*Assistant Examiner*—Ashil Farahmand
(74) *Attorney, Agent, or Firm*—Fogg & Powers LLC (57) ABSTRACT

A method of determining distances between communication nodes. The method includes transmitting an initial communication frame from a first node to at least one second node. The initial communication frame includes a frame preamble, first data and a first switch point. The method further includes synchronizing a local clock of the at least one second node based on the frame preamble. Switching the at least one second node to a transmitting node based on the received switch point. Transmitting a subsequent communication frame from the at least one second node to the first node. The subsequent communication frame includes a ranging preamble, second data and a second switch point. The method continues by synchronizing a local clock in the first node based on the ranging preamble from the at least one second node and determining the range between the first node and the second node based on the ranging preamble.

20 Claims, 8 Drawing Sheets

U.S. PATENT DOCUMENTS

| | | | |
|---|---|---|---|
| 6,167,276 | A | 12/2000 | Pite |
| 6,169,497 | B1 | 1/2001 | Robert |
| 6,172,644 | B1 | 1/2001 | Stilp |
| 6,188,354 | B1 | 2/2001 | Soliman et al. |
| 6,195,046 | B1 | 2/2001 | Gilhousen |
| 6,243,587 | B1 | 6/2001 | Dent et al. |
| 6,243,588 | B1 | 6/2001 | Koorapaty et al. |
| 6,249,253 | B1 | 6/2001 | Nielsen et al. |
| 6,256,505 | B1 | 7/2001 | Kingdon et al. |
| 6,275,471 | B1 | 8/2001 | Bushmitch et al. |
| 6,275,705 | B1 | 8/2001 | Drane et al. |
| 6,282,427 | B1 | 8/2001 | Larsson et al. |
| 6,285,321 | B1 | 9/2001 | Stilp et al. |
| 6,292,516 | B1 | 9/2001 | Petsko et al. |
| 6,321,091 | B1 | 11/2001 | Holland |
| 6,330,452 | B1 | 12/2001 | Fattouche et al. |
| 6,331,825 | B1 | 12/2001 | Ladner et al. |
| 6,342,854 | B1 | 1/2002 | Duffett-Smith et al. |
| 6,347,228 | B1 | 2/2002 | Ludden et al. |
| 6,381,464 | B1 | 4/2002 | Vannucci |
| 6,404,388 | B1 | 6/2002 | Sollenberger et al. |
| 6,421,009 | B2 | 7/2002 | Suprunov |
| 6,593,883 | B2 | 7/2003 | Johnson et al. |
| 6,611,233 | B2 | 8/2003 | Kimura |
| 6,822,951 | B1 | 11/2004 | Patton |
| 7,376,045 | B2 * | 5/2008 | Falkenberg et al. ............ 367/19 |
| 2001/0040702 | A1 | 11/2001 | Leung |
| 2002/0027896 | A1 | 3/2002 | Hughes et al. |
| 2003/0198212 | A1 | 10/2003 | Hoctor et al. |
| 2005/0024038 | A1 | 2/2005 | Santhoff et al. |
| 2005/0026563 | A1 | 2/2005 | Leeper et al. |
| 2005/0030931 | A1 * | 2/2005 | Sung et al. .................. 370/342 |
| 2005/0063328 | A1 | 3/2005 | Dunagan et al. |
| 2005/0096031 | A1 * | 5/2005 | Sugaya et al. ............ 455/422.1 |
| 2005/0135284 | A1 | 6/2005 | Nanda et al. |
| 2005/0271150 | A1 | 12/2005 | Moore et al. |
| 2005/0276319 | A1 | 12/2005 | Akiyama et al. |
| 2006/0187909 | A1 | 8/2006 | Sho et al. |
| 2006/0291537 | A1 | 12/2006 | Fullerton et al. |
| 2007/0232339 | A1 * | 10/2007 | Ji et al. ...................... 455/502 |
| 2007/0253400 | A1 | 11/2007 | Zumsteg |
| 2008/0056308 | A1 * | 3/2008 | Zumsteg ..................... 370/503 |

OTHER PUBLICATIONS

Wotel, Paul. "The Difference Between Half and Full Duplex Explained." Apr. 11, 2005. HelloDirect. <http://web.archive.org/web/20050411083923/http://telecom.hellodirect.com/docs/Tutorials/DuplexExplained.1.080801.asp>.*

Guvenc, L.; Sahinoglu, Z.; Molisch, A.F.; Orlik, R., "Non-coherent TOA estimation in IR-UWB systems with different signal waveforms," Broadband Networks, 2005. BroadNets 2005. 2nd International Conference on , vol. no. pp. 1168-1174 vol. 2, Oct. 7-7, 2005 URL: http://ieeexplore.ieee.org/stamp/stamp.jsp?arnumber=1589740&isnumber=33500.*

PCT Search Report. International Searching Authority: Dec. 18, 2007.

Barrett, Terence, "History of Wideband (UWB) Radar & Communications: Pioneers and Innovators".

Fontana, Robert J., "A Brief History of UWB Communications", , Publisher: Multispectral Solutions, Inc.

Girod, Lewis, "Localization", Publisher: Distributed Embedded Systems.

"802.15.3 MAC layer Overview and Proposed Enhancements to Support UWB PHY", , Publisher: Mobile and Portable Radio Research Group, Virgina Tech, Published in.

Lee, K.K., "UWB Overview", , p. 80.

Pomalaza-Raez, Carlos et al., "A Unified Approach to Dynamic TDMA Slot Assignment and to Distributed Routing for Multi-Hop Packet Radio Networks".

Somayazulu, V. Srinivasa et al., "Design Challenges for Very High Data Rate UWB Systems", , Publisher: Intel Labs, Published in: Hillsboro, OR.

Webb, Warren, "Ultrawideband: An Electronic Free Lunch?", Dec. 21, 2000, pp. 85-92, Publisher: EDN, Published in: US.

Young, C. David, "USAP Multiple: Dynamic Resource Allocation for Mobile Multihop Multichannel Wireless Networking", , pp. 15, Publisher: IEEE.

* cited by examiner

SUB-FRAME SYNCHRONIZED RANGING

BACKGROUND

In many wireless networks, each node may have a need to determine the position of the node, relative to absolute and relative frames of reference. One system providing an absolute frame of reference is the Global Positioning System (GPS), using a constellation of geosynchronous satellites to provide the necessary coordinate reference points. Relative frames of reference are provided by asset tracking systems, such as those monitoring the movement of cooperating devices in a structure, for determining the building-relative position coordinates of a pre-mounted tagging device. Current systems for providing absolute and relative frames of reference typically require the cost and installation of infrastructure equipment, from satellites to fixed location beacons mounted in a structure, as used in many tracking systems.

Ad hoc wireless networks are characterized by the absence of installed infrastructure, and possibly unpredictable orientation and location of such devices. Such systems typically provide only a limited relative frame of reference, with respect to other devices in the ad hoc network. Certain ad hoc network nodes may be augmented with GPS to provide a fixed coordinate system, and hence an absolute frame of reference. However, the size and power requirements necessary for GPS are typically unavailable in energy-constrained ad hoc wireless devices. Also, the unpredictable orientation of the GPS antenna in a device, or a location without suitable GPS signals, may result in a failure to acquire sufficient GPS satellite signals for an accurate position determination by the node. Further, the ad hoc wireless network may only require a relative, not an absolute, frame of reference to perform the desired application, such as perimeter monitoring or surveillance.

In many position determination systems such as GPS, tagged asset tracking and ad hoc wireless networks, the propagation velocity of a radio frequency (RF) signal is used to measure the distance between pairs of cooperating nodes. In air, the approximate velocity of a radio wave is one foot per nanosecond (1 ft./nSec), and the distance between a transmitter and one or more cooperating receivers may be measured using methods such as Time of Flight (TOF) or Time Difference of Arrival (TDOA). The results of such ranging measurements between several pairs of nodes are required, at a minimum, for trilateration to determine the position of just a single device in systems with some fixed infrastructure. More generally, many such ranging measurements are required to perform multilateration, such as required to determine the position of each device in an ad hoc wireless network. Therefore, the accuracy of such ranging measurements is a function of the clock precision utilized for the ranging measurements.

The use of conventional, or data modulated RF bands or channels, for measuring TOF or TDOA may produce inaccurate results due to various influences and effects. Multi-path RF propagation may result in the receiver detecting a higher strength, but longer indirect path RF signal, and measuring a time interval with a larger value than for the direct RF wave path distance. Also, clock synchronization among the devices must be accomplished and maintained, typically through the use of a beacon signal transmitted by a designated node. Since such clocks are typically used for the purpose of providing a time base for demodulating the data, having a modulation frequency orders of magnitude lower than the carrier frequency, the clock is not able to resolve individual cycles of the carrier frequency. Hence, the precision of such ranging measurements is limited to an indirect detection of modulated data contained in a beacon signal, rather than arrival of an RF signal at the receiver. Further, each beacon signal will include a preamble appropriate for the data modulation technique employed Some wireless data communications systems, such as conventional radio frequency systems, provide data communications by modulating, or coding, data signals onto a carrier frequency(s). However, other types of wireless communication systems are carrier-less and rely on time-based coding for data communications. One such communication system that relies on time-based coding to achieve reliable data communications is Ultra Wide Band ("UWB").

These UWB systems, unlike conventional radio frequency communications technology, do not use modulated carrier frequencies to transport data. Instead, UWB systems make use of a wide band energy pulse that transports data using both time-based coding and signal polarization. Time-based coding methods may include pulse-position, pulse-rate or pulse-width techniques. UWB communication systems do not provide a common clock to the transmitting and receiving nodes. Instead, a low-drift clock with a programmable offset value is implemented in each transmitter/receiver node, providing a local reference for time-based coding and decoding. Each of these multiple clock domains is subject to short-term time drift, which will exceed the necessary tolerance for accurate UWB data communication system operation after a predictable time period. As a result, precise time synchronization between the transmitting node and receiving node(s) is imperative in UWB systems to obtain accurate data communications. In order to precisely synchronize receiving node(s) with a transmitting node, UWB systems typically require preambles for each transmitted data frame. However, some applications with potential to benefit from UWB technology cannot be implemented if a preamble is required. Also, many potential applications for UWB technology are size and energy constrained, such as networks of wireless sensors and controls, which seek to minimize transmission time and to conserve energy.

In particular, wireless sensor networks might be composed of two or more communicating nodes. Further, each node may have an arbitrary location and antenna orientation, due for example, to the manner in which the nodes are emplaced. In particular, due to the ad hoc orientation of each sensor node, relative to other nodes, an omni-directional antenna is required for data communications. Further, each sensor node is typically battery-powered, and must use energy in the most efficient manner possible in order to achieve a useful lifespan for the intended application.

Ultra-WideBand (UWB) radio systems typically require a long synchronization period, or frame preamble, in order for one or more receivers (Rx) to accurately time-synchronize with the transmitter (Tx) and achieve successful digital data communications. Many applications considering UWB radios are size- and power-constrained, emphasizing the need to minimize energy consumption. Certain classes of applications require accurate determination of the distances between nodes in a wireless sensor network (i.e. multi-static radar, geo-location, etc.) For time-synchronized UWB data communications, each node's clock must have a precision in the sub-nanosecond range. This clock precision may also be used in the measurement of distance, based on TOF or TDOA measurements of UWB signals between nodes, with a sub-nanosecond clock precision providing distance measurement accuracy on the order of inches. However, each such measurement will incur the full length preamble sequence between a pair of nodes in order to perform the measurement and communicate the result. Since a wireless sensor network is typically required to exchange data as well as measuring distances, a method for achieving both, while minimizing energy consumption is essential to maximize the operational lifetime of a wireless sensor network node, many of which are battery-powered.

For the reasons stated above, and for other reasons stated below which will become apparent to those skilled in the art upon reading and understanding the present specification, there is a need in the communication industries for a method to provide collaboration among two or more transmitter/receiver nodes that utilizes the clock synchronization mechanism required for time-synchronous communication systems to provide highly accurate ranging measurements.

SUMMARY

The above-mentioned problems of current systems are addressed by embodiments of the present invention and will be understood by reading and studying the following specification.

In one embodiment, a method of communication between two or more nodes is provided. The method includes synchronizing the two or more nodes with a frame preamble in an initial communication frame. Exchanging subsequent data communications between the two or more nodes without additional frame preambles until a special re-synchronization switch point occurs. Exchanging a ranging schedule between the two or more nodes. Exchanging ranging pulses in subsequent communication frames between the two or more nodes based on the ranging schedule and determining distances between the nodes based on the ranging pulses.

In another embodiment, a method of determining distances between communication nodes is provided. The method includes transmitting an initial communication frame from a first node to at least one second node. The initial communication frame includes a frame preamble, first data and a first switch point. The method further includes synchronizing a local clock of the at least one second node based on the frame preamble in the initial communication frame. Switching the at least one second node to a transmitting node based on the received switch point. Transmitting a subsequent communication frame from the at least one second node to the first node. The subsequent communication frame includes a ranging preamble, second data and a second switch point. The method continues by synchronizing a local clock in the first node based on the ranging preamble from the at least one second node and determining the range between the first node and the second node based on the ranging preamble.

In yet another embodiment, a communication system is provided. The communication system includes a plurality of nodes adapted to exchange communication frames for a period of time in which the clocks of each node are synchronized based on a frame preamble in an initial communication frame transmitted by one of the nodes. The plurality of nodes are further adapted to determine distances between the nodes with the use of range preambles in subsequent communication frames exchanged between the nodes.

DRAWINGS

The present invention can be more easily understood and further advantages and uses thereof more readily apparent, when considered in view of the description of the preferred embodiments and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention provide methods and systems for efficiently using time-synchronized communications systems for data communication as well as ranging applications. The present invention is related to the Sub-Frame Synchronized Signaling (SFSS) application filed on Dec. 28, 2005, having Ser. No. 11/181,281 (the '281 application) which is herein incorporated by reference. The Sub-Frame Synchronized Signaling application provides methods and apparatus for sub-frame synchronized signaling that avoid many of the long resynchronization periods caused by preambles at the start of each transmission frame. In embodiments of the present invention, once synchronization of communication among cooperating nodes has been established, highly accurate ranging measurements may be made in an efficient manner.

Sub-Frame Synchronized Ranging (SFSR) utilizes the Sub-Frame Synchronized Signaling method, as described in the '281 application, to first communicate, as needed, a schedule of transmissions to every node, then issue a "switch point" signal to cause all collaborating nodes to participate in a ranging application. Each such communicated frame is preceded with a frame preamble for the purpose of enabling clock synchronization among cooperating nodes. The duration of the frame preamble must be long enough to enable two or more nodes to achieve time-synchronization, even when the local clocks in those nodes have the maximum possible time difference.

The transmission schedule accurately determines which node should transmit a ranging preamble sequence during the period of time-synchronization among the nodes. Each ranging preamble is a pre-defined pulse sequence, and only one node is scheduled to transmit during a given time interval. All other nodes are in receive mode during the transmission interval of another node. The duration of a ranging preamble is much shorter than a frame preamble, due to the time-synchronization established among local clocks in two or more nodes during the frame preamble.

Ranges between nodes are determined at each receiving node by measuring the correction factor, or clock offset, the receiving node must apply to a local high precision clock in order to optimize time-synchronization. This clock synchronization mechanism is identical to the process initially used to time-synchronize nodes during transmission of a frame preamble. The difference is the duration of the ranging pulse sequence is much shorter than a frame preamble, since time-synchronization among nodes has already been achieved. Hence the SFSR method maximizes both energy efficiency and ranging accuracy.

As described in the '281 application, the local clocks in all nodes are time-synchronized to the clock in the node transmitting the initial communication message, during the frame preamble. In the present invention, each node then stores a copy of this initial clock offset value, which is used to determine the range between this node and each other cooperating node, by computing a range based on the estimated propagation velocity of RF waves in air and the difference between the initial clock offset, and the clock offset measured while receiving a ranging preamble. As those of skill in the art will understand, this method enables one or more nodes to measure the range between that node and the node transmitting the ranging preamble.

Figure 1A:
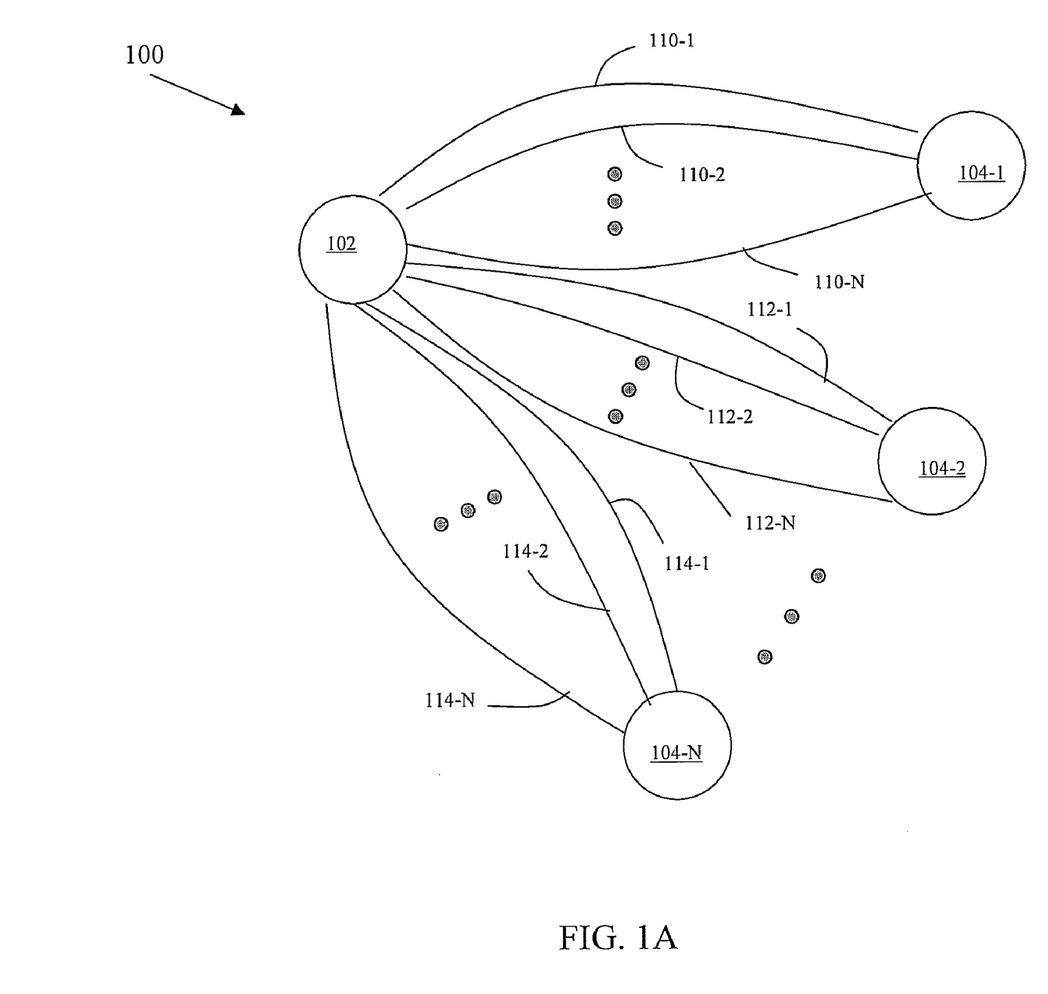
FIG. 1A is a diagram of one embodiment of a communications system of the present invention.

In FIG. 1A an embodiment of a data communications system 100 of the present invention is illustrated. In this embodiment, the data communication system 100 includes communication node 102 and communication nodes 104-1 through 104-N. The communication nodes 102 and 104-1 though 104-N are adapted to communicate with each other. In particular, in the embodiment illustrated in FIG. 1A, communication node 102 is in communication with communication nodes 104-1 through 104-N. However, it will be understood that the present invention can generally apply to two or more communication nodes, any of which may be the initial transmitting node. In embodiments of the present invention, a first communication node initiates a message exchange. In the embodiment of FIG. 1A, this is communication node 102. A message exchange is started when communication node 102 transmits a communication signal that contains a frame preamble. The frame preamble is a known sequence of information that includes information regarding clock timing. Each receiving node uses the information in the frame preamble to synchronize its local clock so communication between the transmitting node and the receiving nodes can occur. In embodiments of the present invention, communication between nodes is maintained without sending an additional frame preamble until internal clocks in the respective nodes have drifted apart far enough that synchronization suitable for UWB data communications has been lost.

Referring back to FIG. 1A, the first communication signals 110-1, 112-1 and 114-1 containing the frame preambles and other data to be exchanged are illustrated. The first communication signals may be referred to as frame synchronization communication signals. Node 102 is the transmitting node when transmitting signals 110-1, 112-1 and 114-1 and nodes 104-1 through 104-N are the receiving nodes when receiving the respective frame communication signals 110-1 and 114-1. At the end of each frame communication signal is an indication that the signal is complete. As described in the '281 application, this is referred to a switch point. The switch point provides a signal to each receiving node indicating when it can become a transmitting node to transmit a communication signal, such as a ranging message, in response to a received signal. All example of this are ranging signals 110-2, 112-2 and 114-2 transmitted from the respective nodes 104-1, 104-2 and 104-N back to node 102 one after another in a pre-arranged sequence. The message exchange between the nodes continues like this until, as discussed above, the internal clocks in the respective nodes have drifted far enough apart that synchronization suitable for UWB data communications has been lost, or until another node transmits a new initial communication containing a frame preamble. The last communication signal between initiating node 102 and nodes 104-1 through 104-N is illustrated as signals 110-N, 112-N and 114-N in FIG. 1A.

Figure 1B:
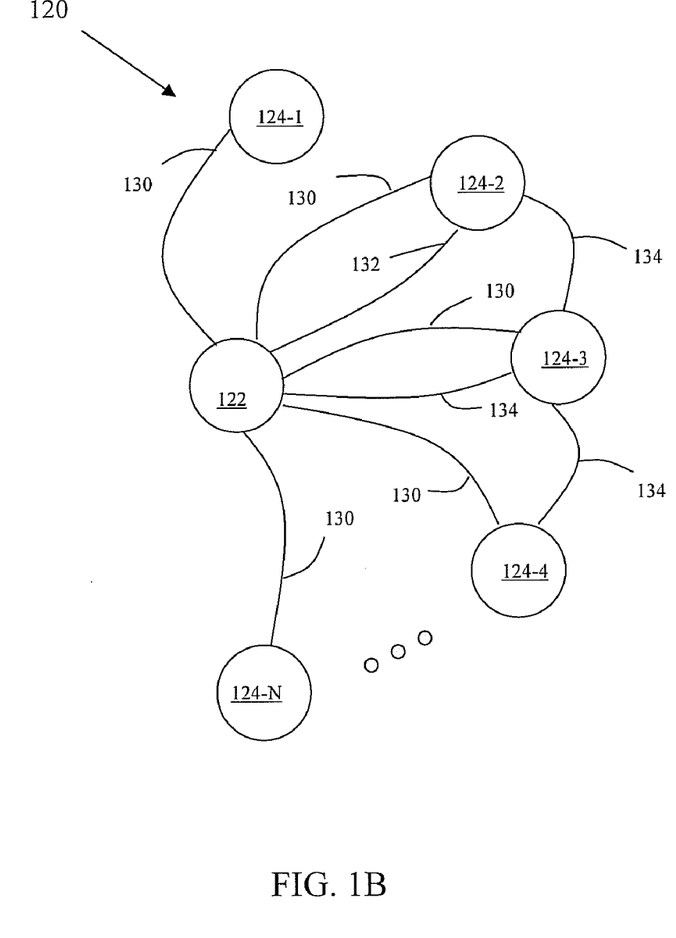
FIG. 1B is a diagram of another embodiment of a communication system of the present invention.

In one embodiment, the data communication system 100 is a point to point communication system where only two nodes are participating at a time. An example of this system in reference to the communication system 100 of FIG. 1A is when node 102 sends a first signal 110-1 to node 104-1 and then a second signal 112-1 at a later time to node 104-2. In another embodiment of the present invention, the data communication system 120 is arranged in a broadcast network where a transmitted signal is received by multiple nodes simultaneously. An example of this is illustrated in FIG. 1B. In this embodiment, only a single frame preamble is required since only one initial transmission signal is sent to the multiple nodes. Referring to FIG. 1B, an initial signal 130 including the single frame synchronization communication signal is broadcast from node 122 to nodes 124-1 through 124-N simultaneously. In this embodiment, a switch point in the transmitted frame communication signal is used to indicate the next transmit node. For example, in the communication system 120 of FIG. 1B, the next node to transmit, as directed by the switch point, is node 124-2. As illustrated ranging signal 132 is transmitted from node 124-2 to node 122. Further in this example, node 124-3 is then directed to transmit ranging signal 134, which is received by nodes 124-2, 124-4 and 122.

Figure 2A:
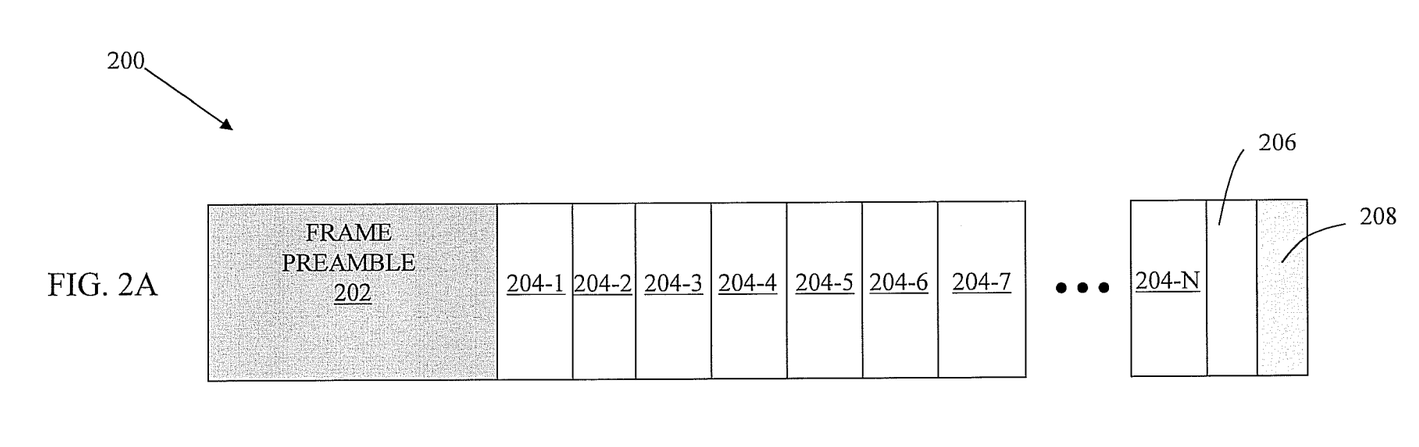
FIG. 2A is a diagram of an initial communication sub-frame of one embodiment of the present invention.

Referring to FIG. 2A, an example of a frame communication signal 200 is illustrated. In particular, the initial signal in this embodiment is a frame communication frame 200. An initial communication frame includes a frame preamble and a sub-frame containing data bits and a switch point. The initial communication frame 200 is sent from a transmitting node (first node) and includes frame preamble 202. Frame preamble 202 contains information used by one or more receiving nodes for synchronization of the receiving node(s) local clock(s). After the frame preamble, information or data is transmitted. The information or data is generally referenced as 204-1 through 204-N and in one embodiment are data communication bits. After the data 204-1 through 204-N has been transmitted, a switch point is transmitted 206. The switch point 206 indicates another node may now transmit in this sub-frame according to a pre-determined schedule. As described in the '281 application, the switch point initiates a link reversal or duplexing, which instructs a particular receiving second node to change into a transmitting node and the initial transmitting node to change into a receiving node. In particular, in one embodiment, once a transmitting node has encountered a switch point, the transmitting node stops transmission, switches into receive mode and adjusts its local clock using the stored initial clock offset value. A different clock offset value is then determined in response to the ranging preamble from the particular receiving second node which is now transmitting. As described in the '281 application, the switch point 206 is used to indicate a change in signal format, which may be followed by additional information exchange 208.

Figure 2B:
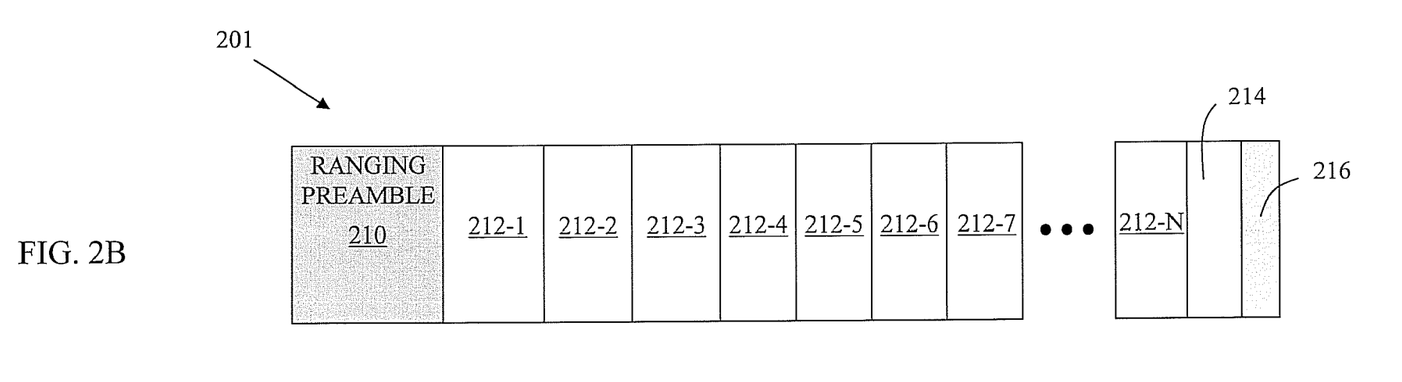
FIG. 2B is a diagram of a ranging sub-frame signal of one embodiment of the present application.

FIG. 2B illustrates a ranging preamble communication sub-frame 201. This communication sub-frame is sent by the second node to the first node. The ranging communication sub-frame includes data 212-1 through 212-N and a switch point 214. Subsequently, additional exchange of information 216 may occur, as described in the '281 application. As illustrated, the ranging preamble 210 is shorter than the frame preamble 202 of FIG. 2A since the cooperating nodes have already been time-synchronized during the frame preamble. Communication between nodes occurs without the need for additional frame preambles, such as frame preamble 202 of FIG. 2A, until the clocks of the first and second nodes have drifted out of time synchronization. Once they have drifted out of time synchronization another initial communication with a frame preamble, similar to frame preamble 202 of FIG. 2A, is required to resynchronize the respective clocks. As those of skill in the art will understand, there may be one or more nodes that receive the transmitted frame preamble and perform time-synchronization of local clocks in the nodes.

Figure 3:
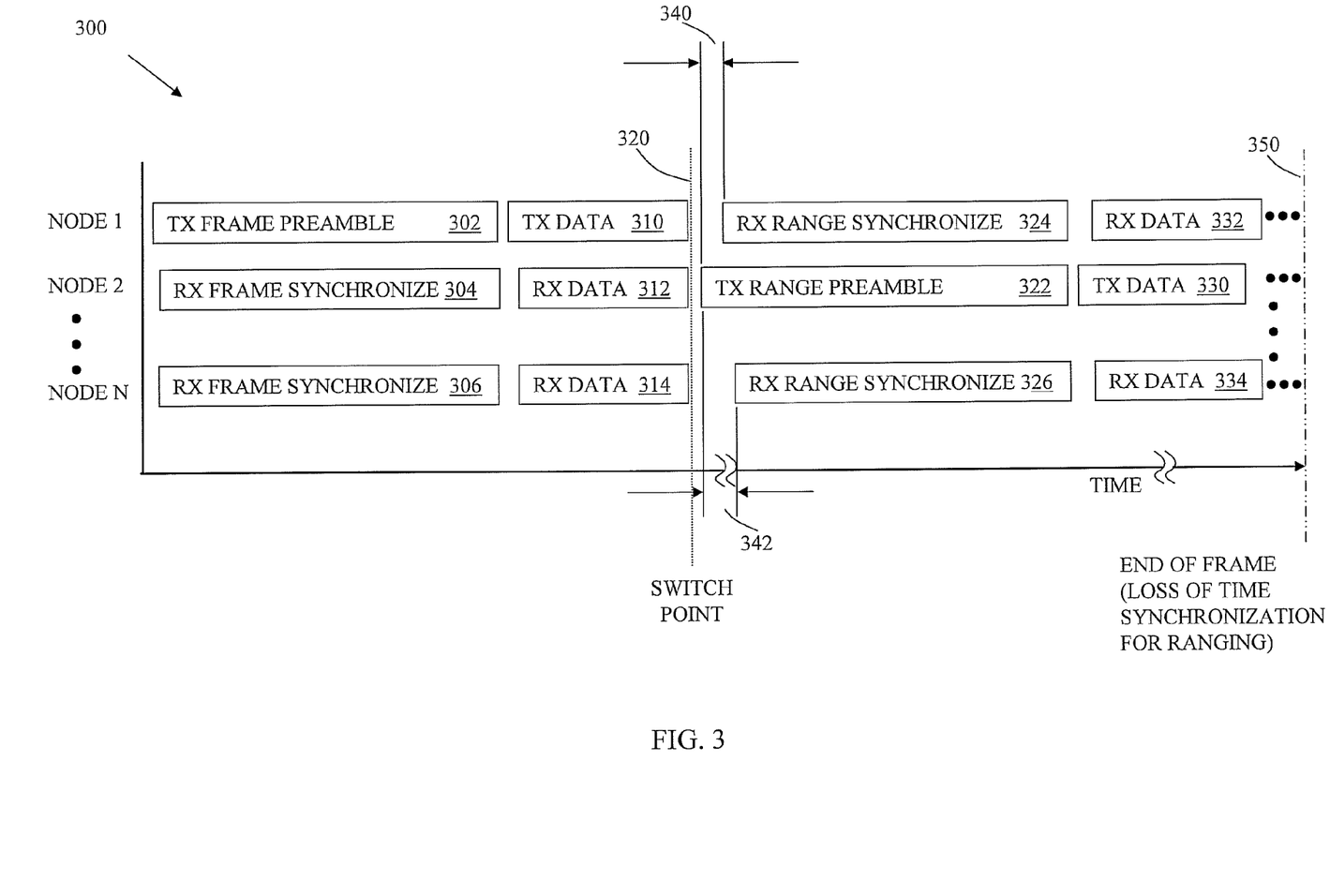
FIG. 3 is a graph illustrating communications and ranging of one embodiment of the present invention.

The embodiment of FIG. 3 illustrates a graph 300 depicting one possible set of time relationships among and between nodes during the frame preamble, ranging preamble and data communication signals. All possible relationships between and among nodes, such as nodes 102 and 104-n in FIG. 1, and nodes 122 and 124-n in FIG. 2, are not knowable in advance, hence it must be understood that due to the dynamic and self-configuring nature of such a system, numerous other operation modes, in addition to the one described, are possible and are to be included by this disclosure.

The embodiment of FIG. 3, illustrates the communication between a first node and one or more other nodes. The first node sends a frame preamble 302 and data communications 310. In response to the frame preamble 302, one or more other nodes synchronize local clocks when receiving the frame preamble 304 and 306. Data is then transmitted 310 by the first node in a sub-frame. One or more other nodes receive the sub-frame data 312 and 314. A link-reversal point 320, or switch point as described in the '281 application, is then reached. A selected second node is than adapted to a transmit a range preamble 322 and data 330, and the first node is adapted to receive the range preamble 324 and data 332 in this second sub-frame. Further, other nodes may also receive the range preamble 326 and data 334 transmitted by the selected second node.

As described in the '281 application, additional switch points may, or may not occur, and communications continues using the current frame clock offsets until the necessary time-synchronization for communications is lost 350. Following the switch point 320, each of the nodes adapted to communicate may use the local clock in each node to determine when to transmit according to a predetermined schedule, such than only a single node is transmitting at a particular time. Each cooperating node utilizes the stored initial clock offset value for both transmitting and receiving range preamble and data signals. The initial clock offset is determined by each node during the time-synchronization performed while receiving a frame preamble 304 and 306.

Due to the physical separation of nodes in a wireless network and the finite propagation velocity of RF waves, there will be a time delay between the transmission of a preamble or data signal and when that signal arrives at one or more receiving nodes. In one embodiment, two such time delays 340 and 342 are indicated in FIG. 3. Time delay 340 is proportional to the range, or distance, between Node 2 and Node 1. A different time delay 342 is proportional to the range between Node 1 and Node N. Each of Node 1 and Node N will determine a different clock offset value during the time-synchronization process using the Node 2 range preamble 322. Node 1 and Node N will store the determined clock offset value, for use in determining the range between each of these nodes and the transmitting Node 2. As will be understood by those of skill in the art, each cooperating node may transmit a ranging preamble or be the initial communicating node as described in the '281 application, all without limitation.

Figure 4:
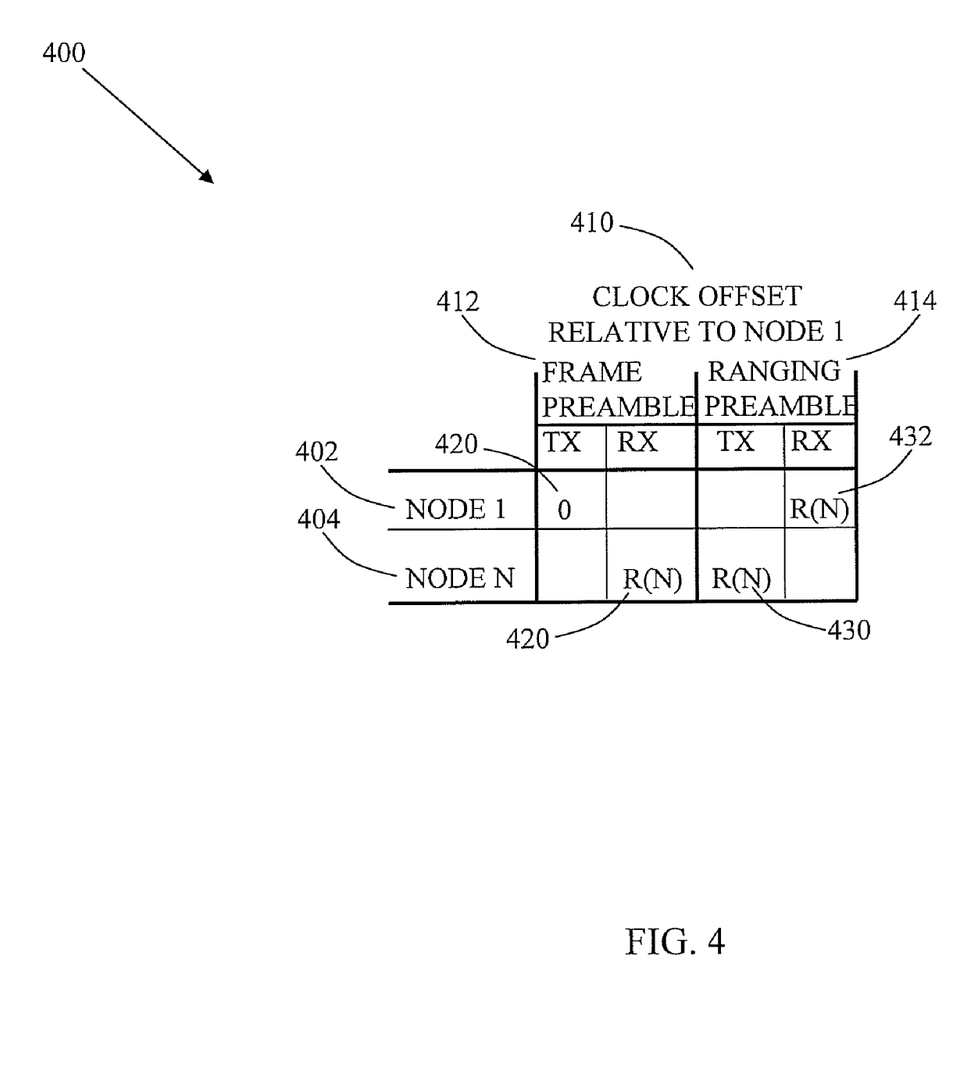
FIG. 4 is a diagram of the clock offset values determined by one embodiment of the present invention.

FIG. 4 illustrates an exemplary relationship among the clock offsets determined and used by each node. Those of skill in the art will understand the exemplary relations may be extended to more than two nodes, by considering each unique pair of nodes in the system. As described in the '281 application, Node 1 is the initial communicating node 402, transmitting at least a frame preamble 410 and possibly data. During such transmissions, Node 1 uses a pre-determined clock offset, for example, a value of zero as shown for Frame Preamble Tx 420. Another node, such as Node N 404 is adapted to receive the frame preamble and determine an initial clock offset 410 value of R(N) 420 necessary to time-synchronize with Node 1. As described above, the initial clock offset R(N) 420 is proportional to the distance between Node 1 and Node N, and is stored by Node N.

In accordance with a pre-determined schedule Node N will transmit a ranging preamble 414, using the initial clock offset value 430 to maintain time-synchronization with Node 1. Due to the physical separation between Node N and Node 1 and the finite propagation velocity of RF waves, there will be a time delay between Node N transmitting the ranging preamble 414 and Node 1 receiving the ranging preamble. Node 1 will perform a time-synchronization process using the ranging preamble 414 transmitted by Node N, and determine a clock offset R(N) 432 which is proportional to the distance between Node N and Node 1. Node 1 then stores the clock offset value R(N) 432, and computes a range value by determining the difference between the initial clock offset 420 and the ranging clock offset 432. Node 1 then reloads the clock offset with the stored initial clock offset to resume time-synchronized communications with other nodes.

Figure 5:
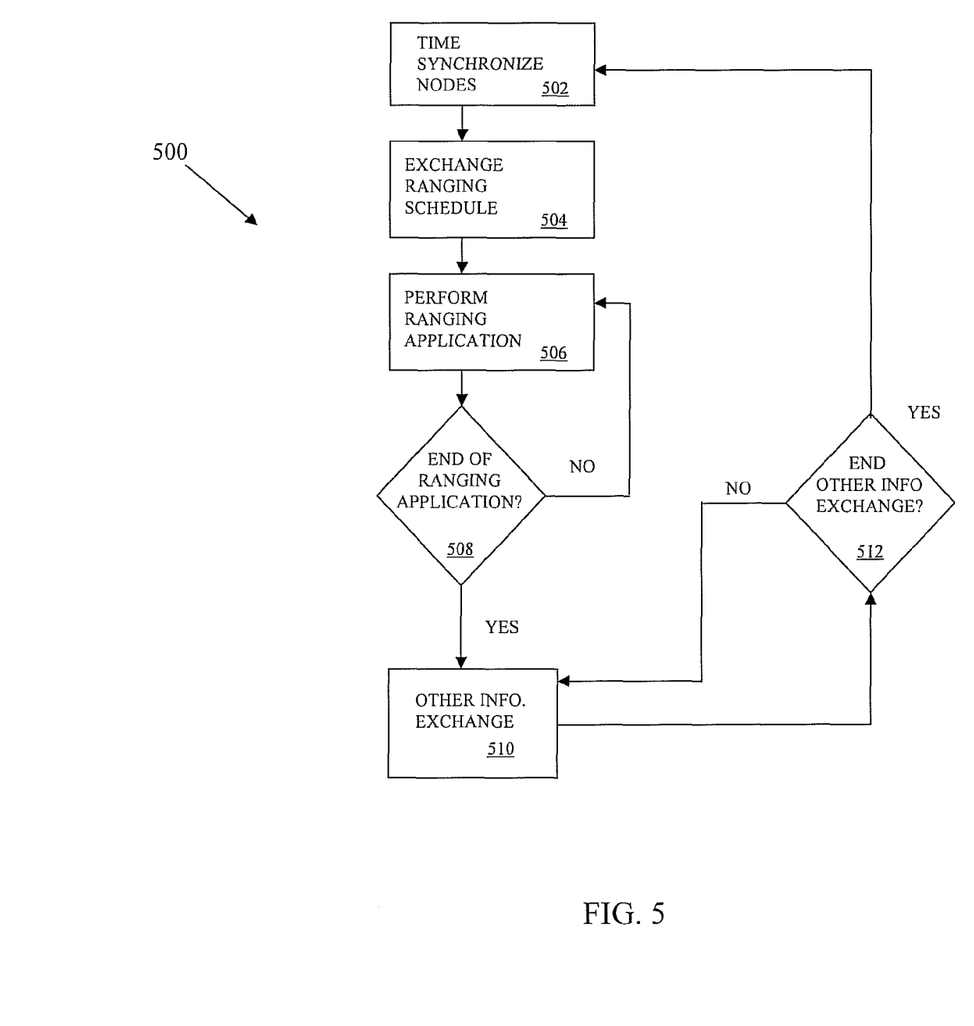
FIG. 5 is a flow diagram of communication and ranging among nodes in a communication system of one embodiment of the present invention

Referring to FIG. 5, a processing flow diagram 500 of the system of one embodiment is illustrated. The processing diagram begins by time-synchronizing the cooperating nodes (502), as described in the '281 application. Once the nodes have been synchronized, data is exchanged with the transmitting node, such as a ranging schedule (504). Subsequent to a switch point, the ranging application is performed (506), with each node acting in turn as described above. Upon completion of the ranging application (508), other information may be exchanged (510) as described in the '281 application, until the data is exchanged or time-synchronization necessary for data communications has been lost (512). The process then repeats as necessary. As will be understood by those of skill in the art and described in the '281 application, each communications frame period may be used by the cooperating nodes for different purposes, as determined by the initial communicating node.

Figure 6A:
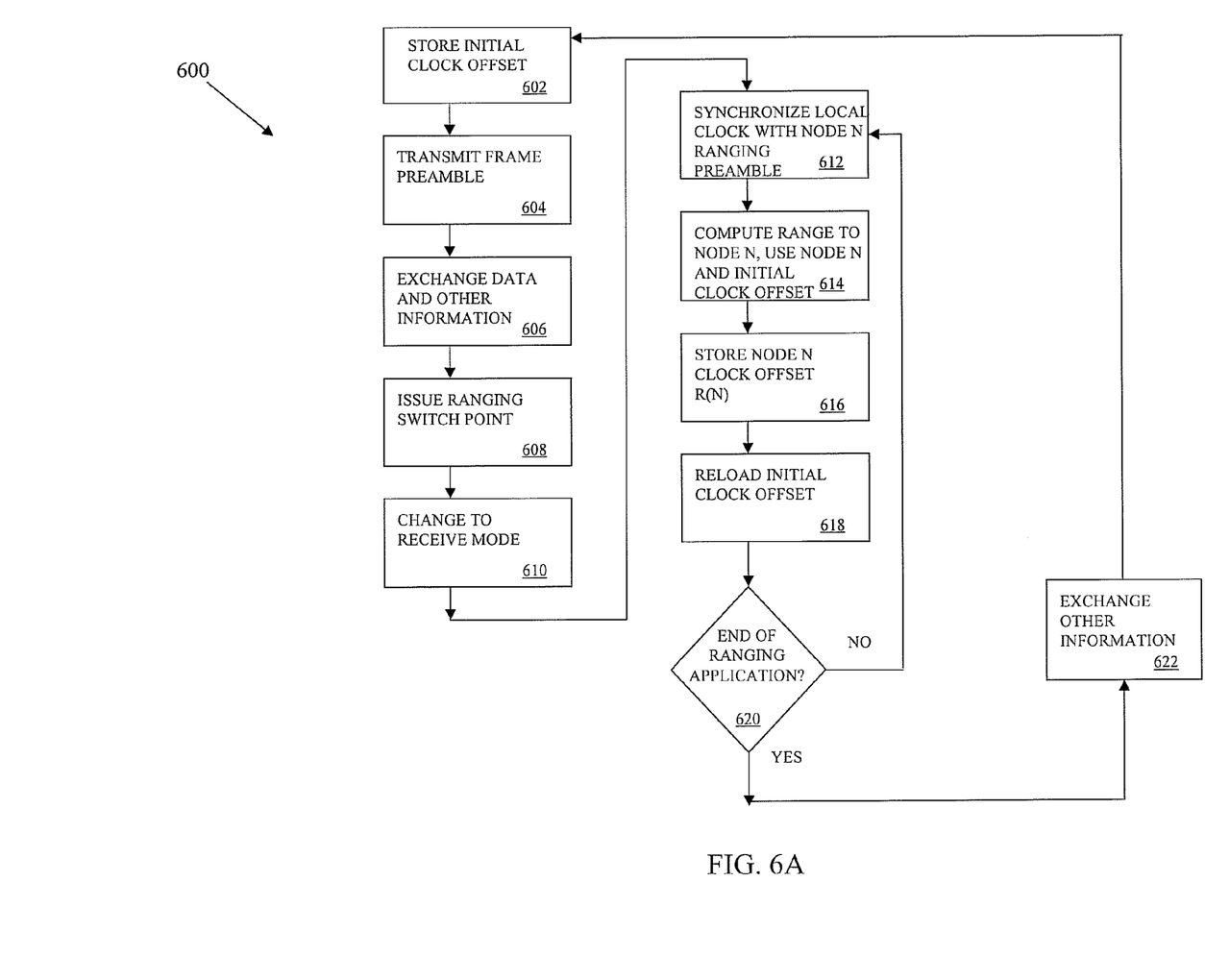
FIG. 6A is a flow diagram of a initiating communication and ranging signals of one embodiment of the present invention.

FIG. 6A illustrates one embodiment of a flow diagram for the initial communicating node, as described by the '281 application. In one embodiment, the initial communicating node first stores an initial clock offset (602), then transmits a frame preamble (604) to be used by other cooperating nodes to each determine and store an initial clock offset value. The initial communicating node may then exchange data and other information (606), such as a ranging schedule, with other nodes. The initial communicating node then issues a switch point, as described in the '281 application, to initiate a ranging application (608). The initial communicating node than changes to receive mode (610) to participate in the ranging application.

In a step (612) the initial communicating node receives a ranging preamble from another node selected to transmit, and computes a range (614) between the transmitting node and the initial communicating node using the stored initial clock offset and the clock offset determined in a step (612). The initial communicating node then stores (616) the clock offset determined from the ranging preamble from the node selected to transmit a ranging preamble. The initial communicating node then reloads the clock offset value with the initial clock offset value (618) to continue time-synchronized communications with other cooperating nodes (620). As described in the 281 application, other information may continue (622).

Figure 6B:
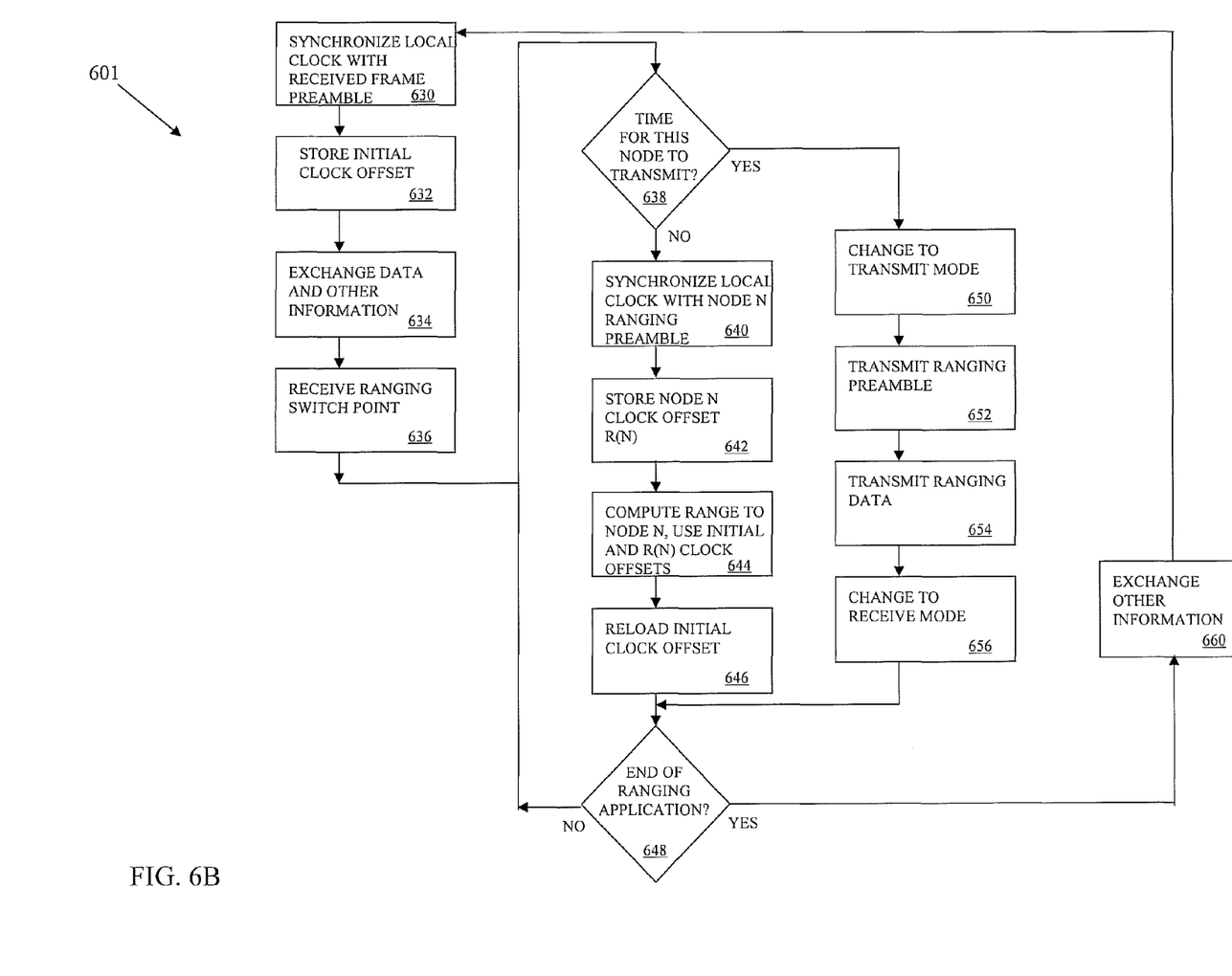
FIG. 6B is a flow diagram of responding to communication and ranging signals of one embodiment of the present invention.

FIG. 6B illustrates one embodiment of a flow diagram for nodes other than the initial communicating node described in the '281 application. Each such cooperating node receives and time-synchronizes (630) using the frame preamble transmitted by the initial communicating node. The determined initial clock offset value is stored by each node (632). Per the '281 application, other data exchange may occur, such as a ranging schedule (634), followed by a switch point transmitted by the initial communicating node and received by the other nodes to initiate the ranging application (636). Each node remains in the receive mode except for the time period determined by the ranging schedule (638).

While in receive mode each node receives a ranging preamble from one or more other nodes in accordance with the ranging schedule and time-synchronizes the local clock in the node (640). Since all cooperating nodes have been time-synchronized to a single clock from the initial communicating node, the determined ranging clock offset, R(N), is proportional to the distance between the node transmitting the ranging preamble and the receiving node, and is stored (642). The range between the transmitting and receiving nodes is then computed (644) and provided to other applications processed on the node. Each receiving node then reloads the clock offset with the initial clock offset (646), and checks for completion of the ranging application (648).

When the scheduled time for a node to transmit a ranging preamble is reached (638) the node changes to transmit mode, still using the initial clock offset value from (632). The node then transmits the ranging preamble (652) and any ranging data (654) which may include, but is not limited to, a unique node identification value. The node then changes back to receive mode (656), and determines whether the ranging application is completed (648). As described in the '281 application, other information exchange may continue (660) within the frame started by the initial communicating node.

What is claimed is:

1. A method of communication between two or more nodes, the method comprising:
synchronizing the two or more nodes with a frame preamble in an initial communication frame;
subsequently exchanging data communications between the two or more nodes without transmitting additional frame preambles from any of the two or more nodes until a special re-synchronization switch point occurs;
exchanging a ranging schedule between the two or more nodes;
exchanging ranging pulses in subsequent communication frames between the two or more nodes based on the ranging schedule; and
determining distances between the nodes based on the ranging pulses.

2. The method of claim 1, wherein synchronizing the two or more nodes with a frame preamble further comprises:
synchronizing local clocks in each of the two or more nodes pursuant to information in the frame preamble.

3. The method of claim 1, wherein exchanging the ranging schedule between the two or more nodes further comprises:
embedding the ranging schedule in data transmitted between the nodes.

4. The method of claim 1, wherein the subsequent communications frames include ranging preambles.

5. The method of claim 4, wherein the ranging preambles are of a shorter duration than the frame preamble.

6. The method of claim 1, wherein determining distances further comprises:
storing an initial clock offset value;
receiving a ranging pulse from an associated node;
measuring the clock offset associated with the received ranging pulse;
determining the difference between the initial clock offset and the measured clock offset; and
using an estimated propagation velocity of the ranging pulse and the determined difference in clock offset to determine a distance between the associated nodes.

7. The method of claim 1, further comprising:
exchanging ranging data.

8. The method of claim 7, wherein the ranging data further comprises:
unique node identification values.

9. A method of determining distances between communication nodes, the method comprising:
transmitting an initial communication frame from a first node to at least one second node, the initial communication frame including a frame preamble, first data and a first switch point;
synchronizing a local clock of the at least one second node based on the frame preamble in the initial communication frame;
switching the at least one second node to a transmitting node based on the received switch point;
transmitting a subsequent communication frame from the at least one second node to the first node without a frame preamble, the subsequent communication frame including a ranging preamble, second data and a second switch point, wherein neither the first node nor the at least one second node transmits an additional frame preamble between the transmission of the initial communication frame and the transmission of the subsequent communication frame from the at least one second node;
synchronizing a local clock in the first node based on the ranging preamble from the at least one second node; and
determining the range between the first node and the second node based on the ranging preamble.

10. The method of claim 9, wherein the first data includes a ranging schedule.

11. The method of claim 9, wherein the duration of the ranging preamble is shorter than the frame preamble.

12. The method of claim 9, further comprising:
storing an initial clock offset value in the first node.

13. The method of claim 12, further comprising:
adjusting the time offset of the first node to reflect the travel delay of the subsequent communication frame from the at least second node to the first node.

14. The method of claim 13, wherein determining the range between the first node and the second node further comprises:

determining the difference between the initial clock offset and the adjusted time offset.

15. The method of claim 12, further comprising:

storing a second initial time offset in the first node to resume communication with the at least one second node.

16. A communication system comprising:

a plurality of nodes adapted to exchange communication frames for a period of time in which the clocks of each node are synchronized based on a frame preamble in an initial communication frame transmitted by one of the nodes, the plurality of nodes further adapted to determine distances between the nodes with the use of range preambles in subsequent communication frames exchanged between the nodes during the period of time, wherein the subsequent communication frames exchanged between the nodes during the period of time are transmitted without additional frame preambles and none of the plurality of nodes transmits an additional frame preamble during the period of time.

17. The communication system of claim 16, wherein each node is adapted to transmit a communication frame including the range preamble based on a received ranging schedule in data in the initial communication frame.

18. The communication system of claim 16, each node further adapted to switch from a transmitting node to a receiving node based on a switch point in a communication frame.

19. The communication system of claim 16, wherein each node is adapted to determine distance to an associated node based on the determination of the difference of an initial time offset stored in the node upon transmission of a communication frame and a second adjusted time offset associated with a received communication frame from the associated node.

20. The communication system of claim 19, wherein each node is further adapted to reload an initial clock offset upon transmission of a communication signal.

* * * * *